US 009455756 B2

United States Patent
Choi et al.

(10) Patent No.: US 9,455,756 B2
(45) Date of Patent: *Sep. 27, 2016

(54) SYSTEMS AND METHODS FOR FREQUENCY INDEPENDENT ANALOG SELF-INTERFERENCE CANCELLATION

(71) Applicant: Kumu Networks, Inc., Santa Clara, CA (US)

(72) Inventors: Jung-Il Choi, Santa Clara, CA (US); Mayank Jain, Santa Clara, CA (US); Joseph Shalizi, Santa Clara, CA (US); Jeff Mehlman, Santa Clara, CA (US)

(73) Assignee: Kumu Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/690,757

(22) Filed: Apr. 20, 2015

(65) Prior Publication Data

US 2016/0043759 A1    Feb. 11, 2016

Related U.S. Application Data

(63) Continuation of application No. 14/456,367, filed on Aug. 11, 2014, now Pat. No. 9,036,749.

(60) Provisional application No. 61/864,459, filed on Aug. 9, 2013.

(51) Int. Cl.
    *H03D 1/04*    (2006.01)
    *H03D 1/06*    (2006.01)
    (Continued)

(52) U.S. Cl.
    CPC ............... *H04B 1/12* (2013.01); *H04B 1/525* (2013.01); *H04L 5/14* (2013.01); *H04L 5/143* (2013.01); *H04L 5/1461* (2013.01); *H04L 27/2691* (2013.01)

(58) Field of Classification Search
    CPC ... H04L 27/2647; H04L 1/20; H04B 1/1027; H04B 1/123; H04B 1/1036
    USPC .......................................................... 375/346
    See application file for complete search history.

(56) References Cited

U.S. PATENT DOCUMENTS

| 4,952,193 A | 8/1990 | Talwar |
| 5,212,827 A * | 5/1993 | Meszko .................. H04B 1/30 455/219 |

(Continued)

FOREIGN PATENT DOCUMENTS

| EP | 0755141 B1 | 10/2005 |
| EP | 1959625 B1 | 2/2009 |

(Continued)

OTHER PUBLICATIONS

Bharadia et al., "Full Duplex Radios" SIGOMM, Aug. 12-16, 2013, Hong Kong, China, Copyright 2013 ACM 978-1-4503-2056-6/6/13/08, 12 pages.

*Primary Examiner* — Nader Bolourchi

(74) *Attorney, Agent, or Firm* — Jeffrey Schox; Thomas Gwinn

(57) ABSTRACT

A system and method for analog self-interference cancellation that includes receiving an RF transmit signal of a full-duplex radio; frequency downconverting the RF transmit signal to an IF transmit signal; transforming the IF transmit signal into an IF self-interference signal using an IF analog self-interference cancelling circuit; frequency upconverting the IF self-interference signal to an RF self-interference signal; and combining the RF self-interference signal with an RF receive signal of the full-duplex radio.

18 Claims, 12 Drawing Sheets

(51) Int. Cl.

| | |
|---|---|
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04B 1/12 | (2006.01) |
| H04L 5/14 | (2006.01) |
| H04L 27/26 | (2006.01) |
| H04B 1/525 | (2015.01) |

(56) References Cited

U.S. PATENT DOCUMENTS

| | | |
|---|---|---|
| 5,691,978 A | 11/1997 | Kenworthy |
| 5,734,967 A | 3/1998 | Kotzin et al. |
| 5,790,658 A | 8/1998 | Yip et al. |
| 5,818,385 A | 10/1998 | Bartholomew |
| 5,930,301 A | 7/1999 | Chester et al. |
| 6,215,812 B1 | 4/2001 | Young et al. |
| 6,411,250 B1 | 6/2002 | Oswald et al. |
| 6,539,204 B1 | 3/2003 | Marsh et al. |
| 6,567,649 B2 | 5/2003 | Souissi |
| 6,639,551 B2 | 10/2003 | Li et al. |
| 6,725,017 B2 | 4/2004 | Blount et al. |
| 6,965,657 B1 | 11/2005 | Rezvani et al. |
| 7,336,940 B2 | 2/2008 | Smithson |
| 7,349,505 B2 | 3/2008 | Blount et al. |
| 7,362,257 B2 | 4/2008 | Bruzzone et al. |
| 7,426,242 B2 | 9/2008 | Thesling |
| 7,509,100 B2 | 3/2009 | Toncich |
| 7,869,527 B2 | 1/2011 | Vetter et al. |
| 8,027,642 B2 | 9/2011 | Proctor et al. |
| 8,055,235 B1 | 11/2011 | Gupta et al. |
| 8,060,803 B2 | 11/2011 | Kim |
| 8,086,191 B2 | 12/2011 | Fukuda et al. |
| 8,155,595 B2 | 4/2012 | Sahin et al. |
| 8,175,535 B2 | 5/2012 | Mu |
| 8,179,990 B2 | 5/2012 | Orlik et al. |
| 8,218,697 B2 | 7/2012 | Guess et al. |
| 8,331,477 B2 | 12/2012 | Huang et al. |
| 8,351,533 B2 | 1/2013 | Shrivastava et al. |
| 8,385,871 B2 | 2/2013 | Wyville |
| 8,422,540 B1 * | 4/2013 | Negus .............. H04B 1/38 370/210 |
| 8,995,410 B2 | 3/2015 | Balan et al. |
| 9,019,849 B2 | 4/2015 | Hui et al. |
| 9,042,838 B2 | 5/2015 | Braithwaite |
| 9,054,795 B2 | 6/2015 | Choi et al. |
| 9,124,475 B2 | 9/2015 | Li et al. |
| 9,184,902 B2 | 11/2015 | Khojastepour et al. |
| 9,312,895 B1 | 4/2016 | Gupta et al. |
| 2002/0064245 A1 | 5/2002 | McCorkle |
| 2003/0031279 A1 | 2/2003 | Blount et al. |
| 2003/0099287 A1 | 5/2003 | Arambepola |
| 2003/0148748 A1 | 8/2003 | Shah |
| 2004/0106381 A1 | 6/2004 | Tiller |
| 2004/0266378 A1 | 12/2004 | Fukamachi et al. |
| 2005/0078743 A1 | 4/2005 | Shohara |
| 2005/0129152 A1 | 6/2005 | Hillstrom |
| 2005/0159128 A1 | 7/2005 | Collins et al. |
| 2005/0190870 A1 | 9/2005 | Blount et al. |
| 2005/0254555 A1 | 11/2005 | Teague |
| 2005/0282500 A1 | 12/2005 | Wang et al. |
| 2006/0273853 A1 | 12/2006 | Suzuki et al. |
| 2007/0018722 A1 | 1/2007 | Jaenecke |
| 2007/0249314 A1 | 10/2007 | Sanders et al. |
| 2007/0274372 A1 | 11/2007 | Asai et al. |
| 2008/0037801 A1 | 2/2008 | Alves et al. |
| 2008/0107046 A1 | 5/2008 | Kangasmaa et al. |
| 2008/0111754 A1 | 5/2008 | Osterhues et al. |
| 2008/0131133 A1 | 6/2008 | Blunt et al. |
| 2008/0192636 A1 | 8/2008 | Briscoe et al. |
| 2008/0219377 A1 | 9/2008 | Nisbet |
| 2009/0022089 A1 | 1/2009 | Rudrapatna |
| 2009/0034437 A1 | 2/2009 | Shin et al. |
| 2009/0047914 A1 | 2/2009 | Axness et al. |
| 2009/0180404 A1 | 7/2009 | Jung et al. |
| 2009/0186582 A1 | 7/2009 | Muhammad et al. |
| 2009/0303908 A1 | 12/2009 | Deb et al. |
| 2010/0014600 A1 | 1/2010 | Li et al. |
| 2010/0014614 A1 | 1/2010 | Leach et al. |
| 2010/0022201 A1 | 1/2010 | Vandenameele |
| 2010/0056166 A1 | 3/2010 | Tenny |
| 2010/0117693 A1 | 5/2010 | Lorg et al. |
| 2010/0150033 A1 | 6/2010 | Zinser et al. |
| 2010/0159858 A1 | 6/2010 | Dent et al. |
| 2010/0215124 A1 | 8/2010 | Zeong et al. |
| 2010/0226416 A1 | 9/2010 | Dent et al. |
| 2010/0226448 A1 | 9/2010 | Dent |
| 2010/0232324 A1 | 9/2010 | Radunovic et al. |
| 2010/0279602 A1 | 11/2010 | Larsson et al. |
| 2010/0295716 A1 | 11/2010 | Yamaki et al. |
| 2011/0013684 A1 | 1/2011 | Semenov et al. |
| 2011/0149714 A1 | 6/2011 | Rimini et al. |
| 2011/0216813 A1 | 9/2011 | Baldemair et al. |
| 2011/0222631 A1 | 9/2011 | Jong |
| 2011/0243202 A1 | 10/2011 | Lakkis |
| 2011/0256857 A1 | 10/2011 | Chen et al. |
| 2011/0268232 A1 | 11/2011 | Park et al. |
| 2011/0319044 A1 | 12/2011 | Bornazyan |
| 2012/0021153 A1 | 1/2012 | Bhandari et al. |
| 2012/0063369 A1 | 3/2012 | Lin et al. |
| 2012/0063373 A1 | 3/2012 | Chincholi et al. |
| 2012/0140685 A1 | 6/2012 | Lederer et al. |
| 2012/0147790 A1 | 6/2012 | Khojastepour et al. |
| 2012/0154249 A1 | 6/2012 | Khojastepour et al. |
| 2012/0155335 A1 | 6/2012 | Khojastepour et al. |
| 2012/0155336 A1 | 6/2012 | Khojastepour et al. |
| 2012/0201153 A1 | 8/2012 | Bharadia et al. |
| 2012/0201173 A1 | 8/2012 | Jain et al. |
| 2013/0005284 A1 | 1/2013 | Dalipi |
| 2013/0044791 A1 | 2/2013 | Rimini et al. |
| 2013/0089009 A1 | 4/2013 | Li et al. |
| 2013/0102254 A1 | 4/2013 | Cyzs et al. |
| 2013/0155913 A1 | 6/2013 | Sarca |
| 2013/0166259 A1 | 6/2013 | Weber et al. |
| 2013/0194984 A1 | 8/2013 | Cheng et al. |
| 2013/0215805 A1 | 8/2013 | Hong et al. |
| 2013/0225101 A1 | 8/2013 | Basaran et al. |
| 2013/0253917 A1 | 9/2013 | Schildbach |
| 2013/0301487 A1 | 11/2013 | Khandani |
| 2013/0301488 A1 | 11/2013 | Hong et al. |
| 2013/0308717 A1 | 11/2013 | Maltsev et al. |
| 2014/0011461 A1 | 1/2014 | Bakalski et al. |
| 2014/0126437 A1 * | 5/2014 | Patil .............. H04B 7/0486 370/310 |
| 2014/0169236 A1 | 6/2014 | Choi et al. |
| 2014/0206300 A1 | 7/2014 | Hahn et al. |
| 2014/0219139 A1 | 8/2014 | Choi et al. |
| 2014/0219449 A1 | 8/2014 | Shattil et al. |
| 2014/0348018 A1 | 11/2014 | Bharadia et al. |
| 2014/0348032 A1 | 11/2014 | Hua et al. |
| 2014/0376416 A1 | 12/2014 | Choi |
| 2015/0156003 A1 | 6/2015 | Khandani |
| 2015/0156004 A1 | 6/2015 | Khandani |
| 2015/0249444 A1 | 9/2015 | Shin et al. |
| 2015/0303984 A1 | 10/2015 | Braithwaite |

FOREIGN PATENT DOCUMENTS

| | | |
|---|---|---|
| EP | 2267946 A2 | 12/2010 |
| RU | 2256985 C2 | 7/2005 |
| WO | 2013185106 A1 | 12/2013 |
| WO | 2014093916 A1 | 6/2014 |

* cited by examiner

SYSTEMS AND METHODS FOR FREQUENCY INDEPENDENT ANALOG SELF-INTERFERENCE CANCELLATION

CROSS-REFERENCE TO RELATED APPLICATIONS

This application is a continuation of U.S. patent application Ser. No. 14/456,367, which claims the benefit of U.S. Provisional Application Ser. No. 61/864,459, filed on 9 Aug. 2013, both of which are incorporated in their entireties by this reference.

TECHNICAL FIELD

This invention relates generally to the wireless communications field, and more specifically to new and useful systems and methods for frequency independent analog self-interference cancellation.

BACKGROUND

Traditional wireless communication systems are half-duplex; that is, they are not capable of transmitting and receiving signals simultaneously on a single wireless communications channel. Recent work in the wireless communications field has led to advancements in developing full-duplex wireless communications systems; these systems, if implemented successfully, could provide enormous benefit to the wireless communications field. For example, the use of full-duplex communications by cellular networks could cut spectrum needs in half. One major roadblock to successful implementation of full-duplex communications is the problem of self-interference. While progress has been made in this area, many of the solutions intended to address self-interference fall short in performance, especially in environments where self-interference is significantly frequency dependent across the band of transceiver operation. Thus, there is a need in the wireless communications field to create new and useful systems and methods for frequency independent analog self-interference cancellation. This invention provides such new and useful systems and methods.

DESCRIPTION OF THE PREFERRED EMBODIMENTS

Figure 1:
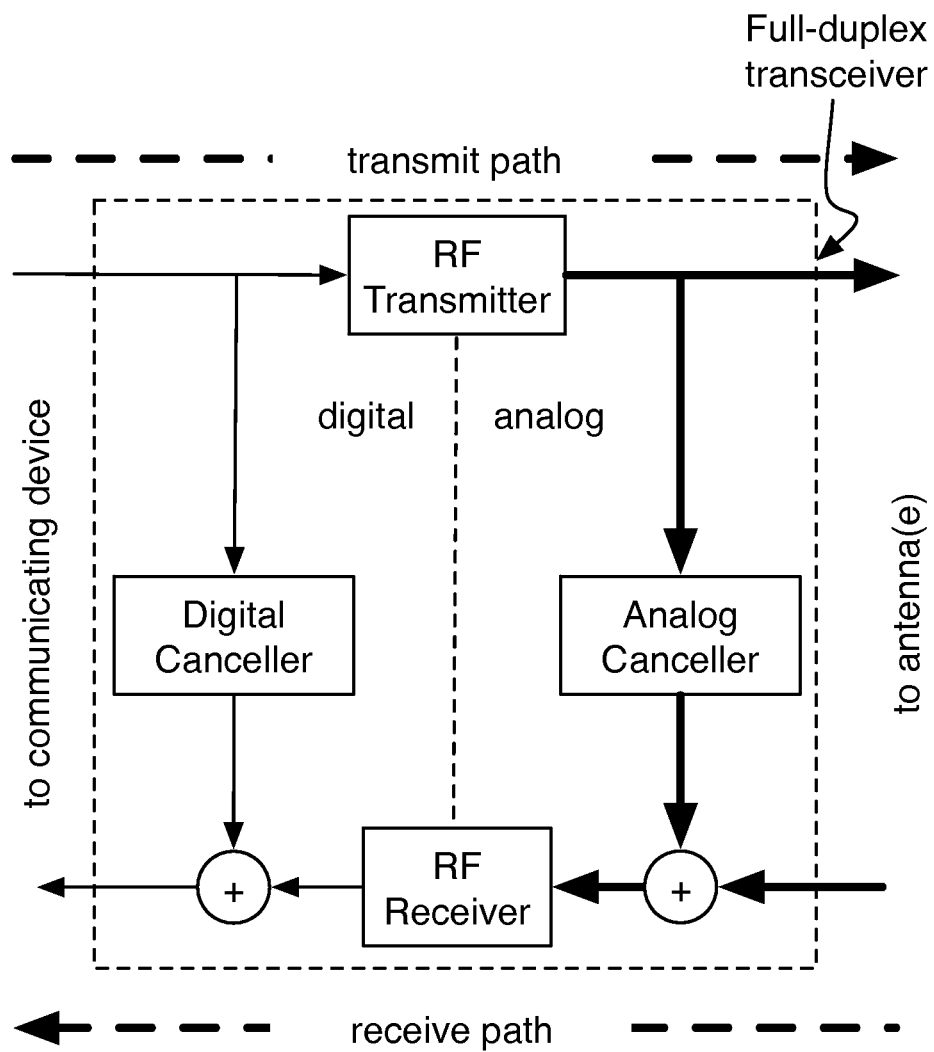
FIG. 1 is a diagram representation of full-duplex radio including digital and analog self-interference cancellation.

The following description of the preferred embodiments of the invention is not intended to limit the invention to these preferred embodiments, but rather to enable any person skilled in the art to make and use this invention.

1. Full-Duplex Wireless Communication Systems

Wireless communications systems have revolutionized the way the world communicates, and the rapid growth of communication using such systems has provided increased economic and educational opportunity across all regions and industries. Unfortunately, the wireless spectrum required for communication is a finite resource, and the rapid growth in wireless communications has also made the availability of this resource a scarcer one. As a result, spectral efficiency has become increasingly important to wireless communications systems.

One promising solution for increasing spectral efficiency is found in full-duplex wireless communications systems; that is, wireless communications systems that are able to transmit and receive wireless signals at the same time on the same wireless channel. This technology allows for a doubling of spectral efficiency compared to standard half-duplex wireless communications systems.

While full-duplex wireless communications systems have substantial value to the wireless communications field, such systems have been known to face challenges due to self-interference; because reception and transmission occur at the same time on the same channel, the received signal at a full-duplex transceiver may include undesired signal components from the signal being transmitted from that transceiver. As a result, full-duplex wireless communications systems often include analog and/or digital self-interference cancellation circuits to reduce self-interference.

Full-duplex transceivers preferably sample transmission output as baseband digital signals or as radio-frequency (RF) analog signals, but full-duplex transceivers may additionally or alternatively sample transmission output in any suitable manner. This sampled transmission output may be used by full-duplex transceivers to remove interference from received wireless communications data (e.g., as RF analog signals or baseband digital signals). In many full-duplex transceivers, the analog cancellation system functions by summing delayed and scaled versions of the RF transmit signal to create an RF self-interference signal, which is then subtracted from the RF receive signal. This architecture is generally effective for reducing interference when received self-interference does not vary substantially across frequency in the receiver pass band, but is significantly reduced in effectiveness in situations where received self-interference does vary substantially across frequency. Such situations often occur due to non-ideal antenna response, strong multi-path environments, RF transceiver non-idealities, and other channel interference effects. The previously described architecture also may be reduced in effectiveness if used in situations where the RF transceiver operates on more than one frequency band; an analog canceller designed to cancel self-interference in more than one frequency band is often less effective than one designed with only a single frequency band in mind. The inability to retain high-effectiveness self-interference cancellation in all of these situations may limit the usefulness of a full-duplex transceiver.

The systems and methods described herein increase the performance of full-duplex transceivers as shown in FIG. 1 (and other applicable systems) by increasing the effectiveness of analog self-interference cancellation in situations where received self-interference is significantly frequency-dependent. Other applicable systems include active sensing systems (e.g., RADAR), wired communications systems, wireless communications systems, and/or any other suitable system, including communications systems where transmit and receive bands are close in frequency, but not overlapping.

2. System for Frequency Independent Analog Self-Interference Cancellation

Figure 2:
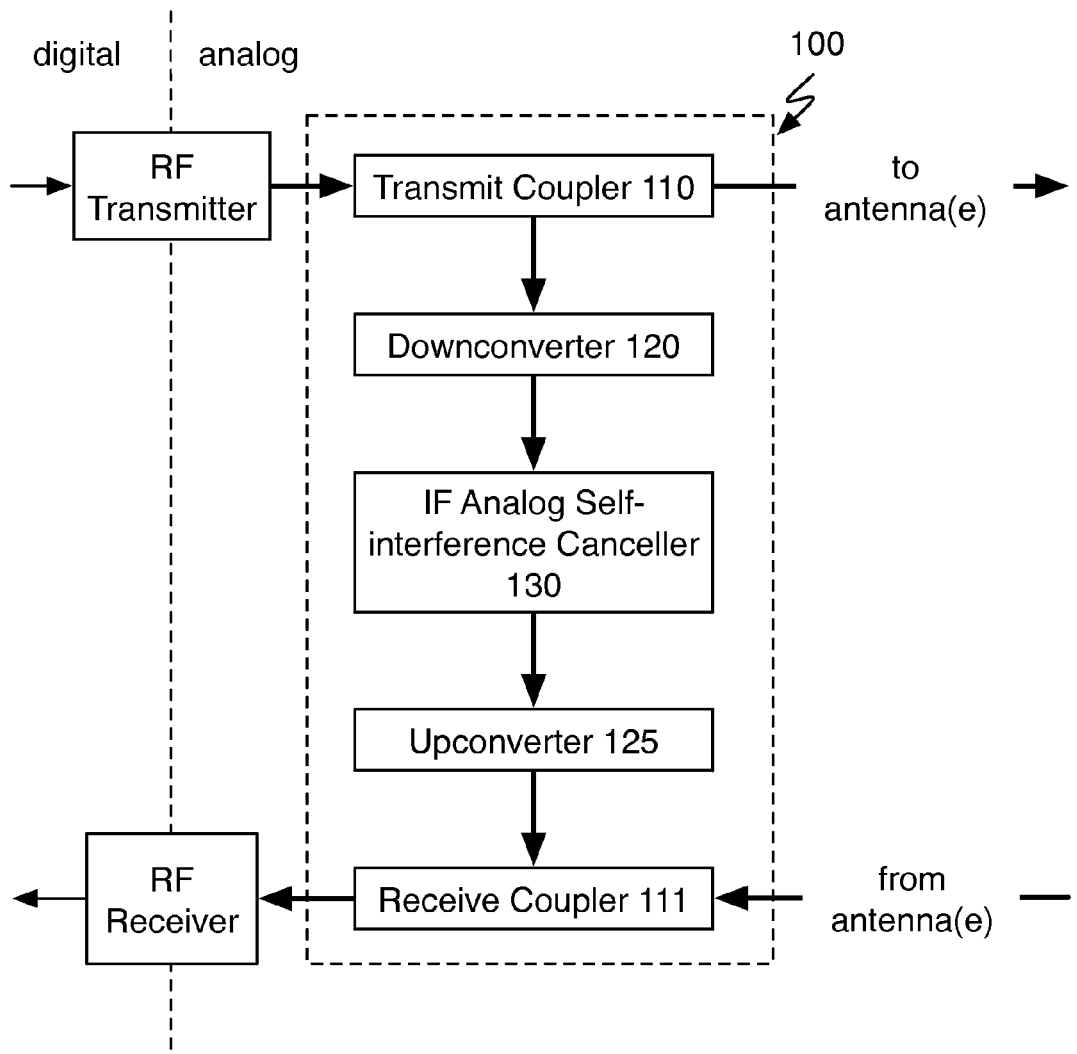
FIG. 2 is a diagram representation of a system of a preferred embodiment.
Figure 3:
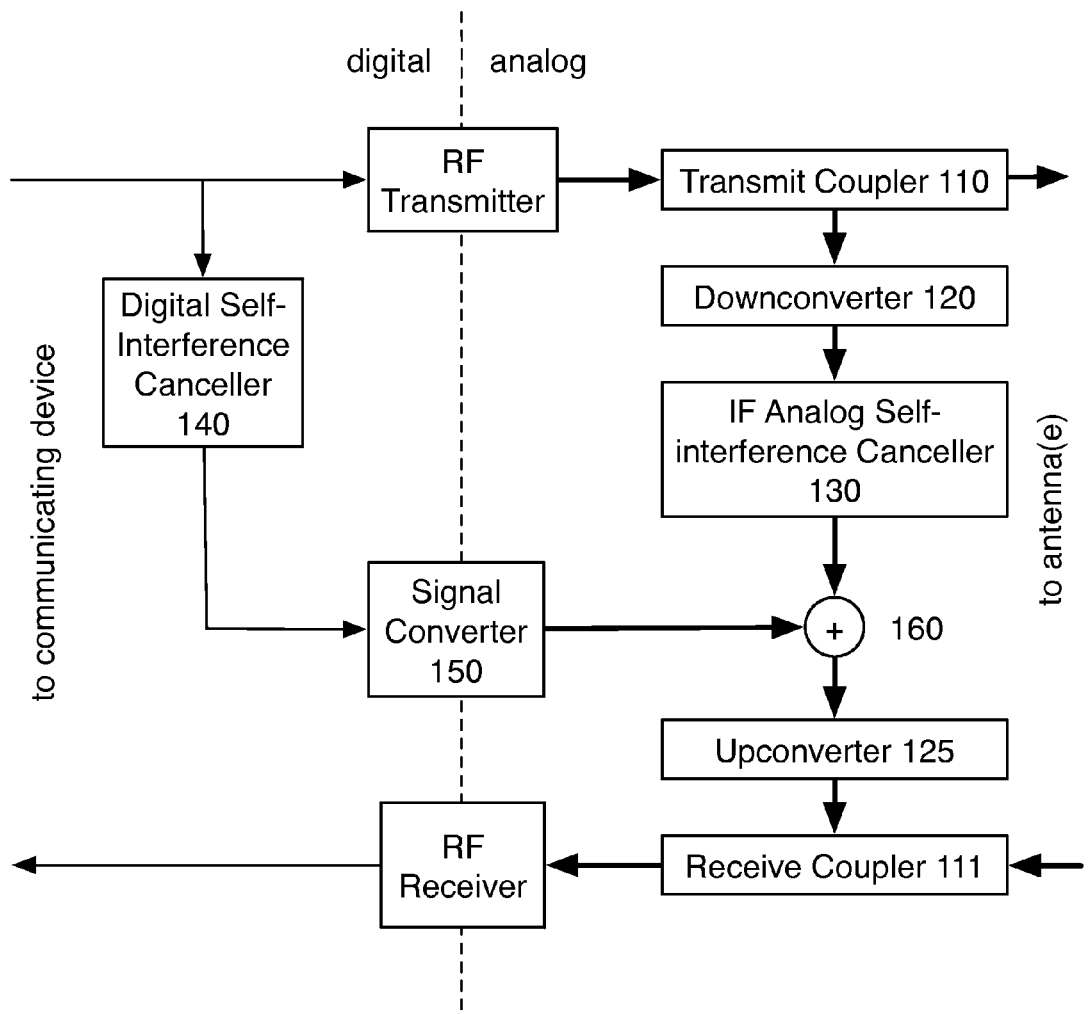
FIG. 3 is a diagram representation of a system of a preferred embodiment.

As shown in FIG. 2, a system 100 for frequency independent analog self-interference cancellation includes a transmit coupler 110, a receive coupler 111, a downconverter 120, an upconverter 125, and an intermediate-frequency (IF) analog self-interference canceller 130. As shown in FIG. 3, the system 100 may additionally include a digital self-interference canceller 140, a digital self-interference signal converter 150, and/or an intermediate-frequency (IF) self-interference signal combiner 160.

The system 100 functions to increase the performance of full-duplex transceivers by performing tunable filter-based analog self-interference cancellation in an intermediate-frequency (IF) domain. Through the use of the downconverter 120 and the upconverter 125, the system 100 can perform analog self-interference cancellation for multiple frequency bands of interest while designing the self-interference canceller 130 for a single band of interest, centered on the intermediate frequency. Within the IF band, the self-interference canceller 130 preferably uses tunable filtering and signal splitting to model self-interference in each band section (corresponding to frequency sections of the original RF transmit signal); separating the self-interference generation into band sections allows the self-interference canceller 130 to produce accurate self-interference signals even in situations where self-interference is highly variable across frequency sections.

The system 100 is preferably implemented using analog integrated circuits (ICs) but may additionally or alternatively be implemented using discrete components (e.g., capacitors, resistors, transistors), wires, transmission lines, waveguides, digital components, mixed-signal components, or any other suitable components.

Figure 4A:
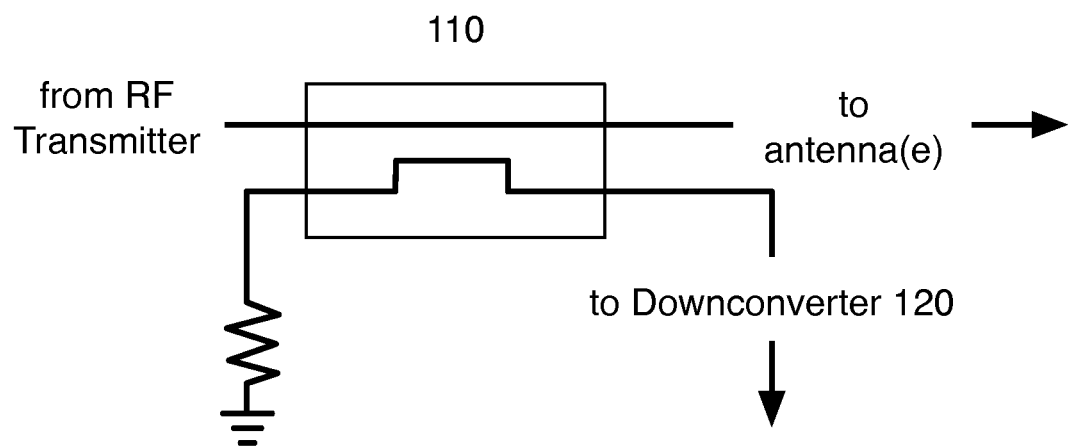
FIG. 4A is a schematic representation of a transmit coupler of a system of a preferred embodiment.

The transmit coupler no, as shown in FIG. 4A, functions to provide a sample of an RF transmit signal of a full-duplex radio to the system 100. The transmit coupler 110 input is preferably coupled directly to an RF transmitter of the full-duplex radio, but may additionally or alternatively be coupled indirectly to the RF transmitter and/or be coupled to another suitable RF transmission source. The transmit coupler no preferably has two outputs, one coupled to antenna (e) of the full-duplex radio (directly or indirectly) and another coupled to the downconverter 120. The transmit coupler no preferably routes the majority of input power to the antenna(e) output port, but may additionally or alternatively route power in any suitable manner (e.g., routing the majority of power to the downconverter port). The transmit coupler 110 may have any number of input and output ports, including bidirectional input/output ports.

The transmit coupler no is preferably a short section directional transmission line coupler, but may additionally or alternatively be any power divider, power combiner, directional coupler, or other type of signal splitter suitable for coupling an RF transmit line of a full-duplex radio to the system 100. The transmit coupler no is preferably a passive coupler, but may additionally or alternatively be an active coupler (for instance, including power amplifiers). For example, the transmit coupler no may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The output ports of the transmit coupler no are preferably phase-shifted by ninety degrees, but may additionally or alternatively be in phase or phase shifted by a different amount.

Figure 4B:
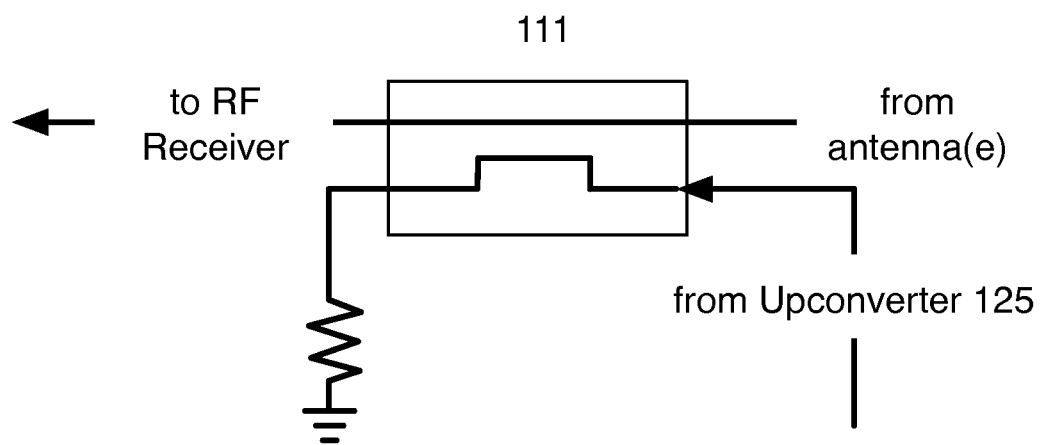
FIG. 4B is a schematic representation of a receive coupler of a system of a preferred embodiment.

The receive coupler 111, as shown in FIG. 4B, functions to couple the upconverted analog self-interference signal generated by the system 100 to the RF receive signal of the full-duplex radio. The receive coupler 111 output is preferably coupled directly to an RF receiver of the full-duplex radio, but may additionally or alternatively be coupled indirectly to the RF receiver and/or be coupled to another suitable RF receiver. The receive coupler 111 preferably has two inputs, one coupled to antenna(e) of the full-duplex radio (directly or indirectly) and another coupled to the upconverter 125. The receive coupler 111 preferably couples the majority of power from the upconverter input power to the RF receiver output port; this coupling preferably results in the RF receiver output port outputting a sum of the self-interference signal (generated by the system 100) and the RF receive signal (received at the antenna(e)). Additionally or alternatively, the receive coupler 111 may couple or route power in any suitable manner. The receiver coupler 111 may have any number of input and output ports, including bidirectional input/output ports.

The receive coupler is preferably a short section directional transmission line coupler, but may additionally or alternatively be any power divider, power combiner, directional coupler, or other type of signal splitter suitable for coupling the self-interference signal generated by the system 100 to an RF receive signal of a full-duplex radio. The receive coupler 111 is preferably a passive coupler, but may additionally or alternatively be an active coupler (for instance, including power amplifiers). For example, the receive coupler 111 may comprise a coupled transmission line coupler, a branch-line coupler, a Lange coupler, a Wilkinson power divider, a hybrid coupler, a hybrid ring coupler, a multiple output divider, a waveguide directional coupler, a waveguide power coupler, a hybrid transformer coupler, a cross-connected transformer coupler, a resistive tee, and/or a resistive bridge hybrid coupler. The input ports of the receive coupler 111 are preferably phase-shifted ninety degrees from each other, but may additionally or alternatively be phase-shifted by any suitable amount to correct for phase offsets (or any other suitable reason). The input ports of the receive coupler 111 may additionally or alternatively not be phase-shifted.

The transmit coupler 110 and receive coupler 111 preferably connect to a single antenna of the full duplex radio through a duplexer (e.g. a circulator), but may additionally or alternatively connect to multiple antennae. In one example, the transmit coupler 110 and receive coupler 111 connect to two separate antennae (e.g. a transmit antenna and a receive antenna); in another example, the transmit coupler 110 and receive coupler 111 both connect to the same two antennae. The transmit coupler 110 and receive coupler 111 may additionally or alternatively connect to any suitable RF transmit and RF receive sources (e.g. an RF signal transmitted solely over coaxial cable). There may additionally or alternatively be filters, power amplifiers, and/or any other RF signal modifying components between the couplers 110, 111 and antennae.

Figure 5A:
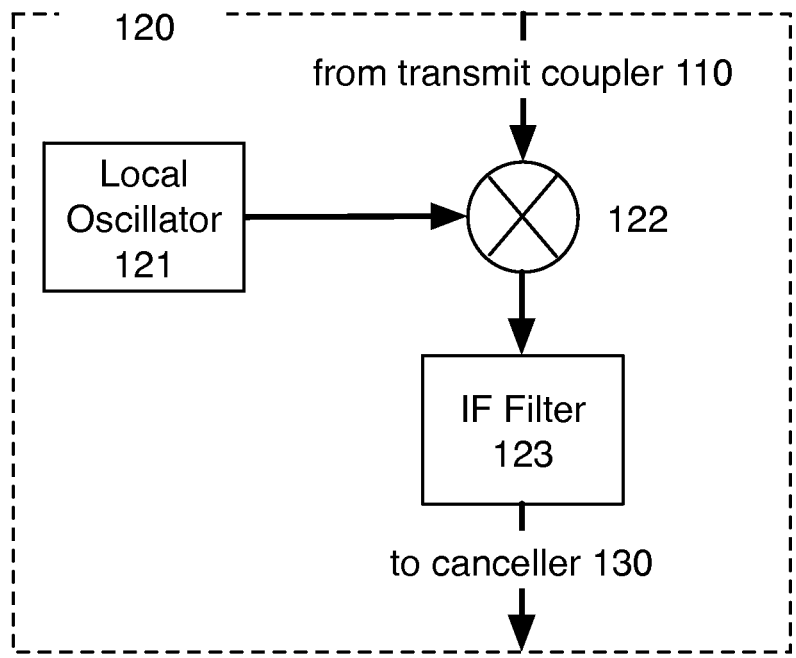
FIG. 5A is a schematic representation of a downconverter of a system of a preferred embodiment.

The downconverter 120, as shown in FIG. 5A, functions to downconvert the carrier frequency of the RF transmit signal (received from the transmit coupler 110) to an intermediate frequency (or, in some cases, baseband (IF=0 Hz)) preparing it for transformation by the IF analog self-interference canceller 130. The downcoverter 120 is preferably communicatively coupled to the transmit coupler 110 and the IF analog self-interference canceller 130, and preferably receives RF transmit signals from the transmit coupler 110, downconverts the signal to an intermediate frequency, and passes the resulting IF transmit signal to the IF analog self-interference canceller 130. The downconverter 120 preferably accomplishes signal downconversion using heterodyning methods, but may additionally or alternatively use any suitable downconversion methods.

The downconverter 120 preferably includes a local oscillator 121, a mixer 122, and an IF filter 123. The local oscillator 121 functions to provide a frequency shift signal to the mixer 122; the mixer 122 combines the frequency shift signal and the RF transmit signal to create (usually two) frequency shifted signals, one of which is the IF transmit signal, and the IF filter 123 rejects signals other than the IF transmit signal.

In one example, the RF transmit signal has a carrier frequency of 2.4 GHz, and the desired IF frequency is 100 MHz. The local oscillator 121 operates at a frequency of 2.3 GHz. The mixer 122 takes the RF transmit signal (from the transmit coupler 110) and the frequency shift signal (from the local oscillator 121) to produce two output signals; a frequency sum signal (at 4.7 GHz) and a frequency difference signal (at 100 MHz). The IF filter 123 is a bandpass filter centered around 100 MHz that allows the 100 MHz signal to pass, but rejects the 4.7 GHz signal. The resulting 100 MHz signal is the IF transmit signal.

The local oscillator 121 is preferably a digital crystal variable-frequency oscillator (VFO) but may additionally or alternatively be an analog VFO or any other suitable type of oscillator. The local oscillator 121 preferably has a tunable oscillation frequency to enable RF signals of different carrier frequency to be downconverted to the same IF carrier frequency. Enabling different RF carrier frequencies to be converted to the same IF carrier frequency allows the IF analog self-interference canceller 130 to operate at a single (IF) frequency while still providing cancellation for multiple RF frequencies.

The mixer 122 is preferably an active mixer, but may additionally or alternatively be a passive mixer. The mixer 122 may comprise discrete components, analog ICs, digital ICs, and/or any other suitable components. The mixer 122 preferably functions to combine two or more electrical input signals into one or more composite outputs, where each output includes some characteristics of at least two input signals.

The IF filter 123 is preferably a bandpass filter centered around a set intermediate frequency. Additionally or alternatively, the IF filter 123 may be a bandpass filter centered around a tunable intermediate frequency, a lowpass filter, or any other suitable type of filter. The IF filter 123 is preferably a passive filter, but may additionally or alternatively be an active filter. The IF filter 123 is preferably implemented with analog circuit components, but may additionally or alternatively be digitally implemented.

The downconverter 120 may additionally or alternatively include any other suitable components to prepare the RF transmit signal for transformation by the IF analog self-interference canceller 130 (e.g., amplifiers, signal processors, filters, etc.). The downconverter 120 may function to scale, shift, and/or otherwise modify the RF transmit signal.

Figure 5B:
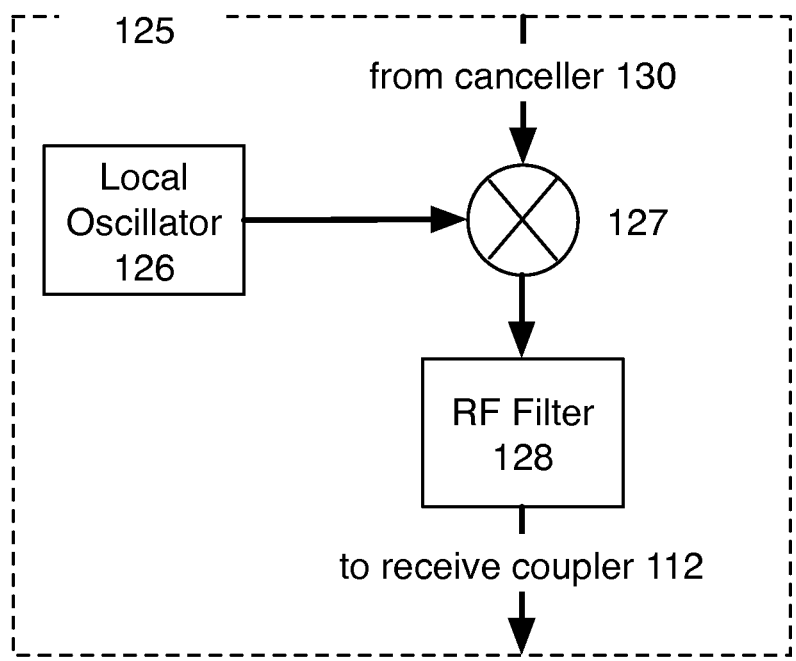
FIG. 5B is a schematic representation of an upconverter of a system of a preferred embodiment.

The upconverter 125, as shown in FIG. 5B, functions to upconvert the carrier frequency of the IF self-interference signal (received from the IF analog self-interference canceller 130 and/or the IF self-interference signal combiner 160) to a radio frequency, preparing it for combination with the RF receive signal at the receive coupler 111. The upconverter 125 is preferably communicatively coupled to the receive coupler 111 and the IF analog self-interference canceller 130, and preferably receives IF self-interference signals from the IF analog self-interference canceller 130, upconverts the signal to a radio frequency, and passes the resulting RF self-interference signal to the receive coupler 111. The upconverter 125 preferably accomplishes signal upconversion using heterodyning methods, but may additionally or alternatively use any suitable upconversion methods.

The upconverter 125 preferably includes a local oscillator 126, a mixer 127, and an RF filter 128. The local oscillator 126 functions to provide a frequency shift signal to the mixer 127; the mixer 127 combines the frequency shift signal and the IF self-interference signal to create (usually two) frequency shifted signals, one of which is the RF self-interference signal, and the RF filter 128 rejects signals other than the RF self-interference signal.

In one example, the IF self-interference signal has a carrier frequency of 100 MHz, and the desired RF frequency (the frequency of the RF receive signal) is 2.4 GHz. The local oscillator 126 operates at a frequency of 2.3 GHz. The mixer 127 takes the IF self-interference signal (from the IF analog self-interference canceller 130) and the frequency shift signal (from the local oscillator 126) to produce two output signals; a frequency sum signal (at 2.4 GHz) and a frequency difference signal (at 2.2 GHz). The RF filter 123 is a bandpass filter centered around 2.4 GHz that allows the 2.4 GHz signal to pass, but rejects the 2.2 GHz signal. The resulting 2.4 GHz signal is the RF self-interference signal.

The local oscillator 126 is preferably substantially similar to the local oscillator 121, but may additionally or alternatively be any suitable local oscillator. In one variation of a preferred embodiment, the local oscillator 121 of the downconverter 120 and the local oscillator 126 of the upconverter 125 are the same local oscillator. In another variation, the local oscillator 121 and local oscillator 126 are distinct, but tuned to the same oscillation frequency.

The mixer 127 is preferably substantially similar to the mixer 122, but may additionally or alternatively be any suitable frequency mixer.

The RF filter 128 is preferably a bandpass filter centered around a tunable radio frequency. Additionally or alternatively, the RF filter 128 may be a bandpass filter centered around a set radio frequency, or any other suitable type of filter. The RF filter 128 is preferably a passive filter, but may additionally or alternatively be an active filter. The RF filter 128 is preferably implemented with analog circuit components, but may additionally or alternatively be digitally implemented.

The upconverter 125 may additionally or alternatively include any other suitable components to prepare the IF self-interference signal for combination with the RF receive signal at the receive coupler 111 (e.g., amplifiers, signal processors, filters, etc.). The upconverter 125 may function to scale, shift, and/or otherwise modify the IF self-interference signal.

The IF analog self-interference canceller 130 functions to produce an IF self-interference signal from the IF transmit signal (i.e., the downconverted RF transmit signal) that, after upconversion, can be combined with the RF receive signal to reduce self-interference present in the RF receive signal. The IF analog self-interference canceller 130 is preferably designed to operate at a single IF frequency band, but may additionally or alternatively be designed to operate at multiple IF frequency bands. Designing the IF analog self-interference canceller 130 to operate at a single IF frequency band may reduce design compromises that may be made when designing for multiple frequency bands. Because the downconverter 120 and upconverter 125 may enable signals of multiple RF frequency bands to be converted to the same IF frequency band; an IF analog self-interference canceller 130 operating at a single IF band may still perform self-interference cancellation for multiple RF frequency bands.

The IF analog self-interference canceller 130 preferably is designed to operate at an intermediate frequency that decreases the component and/or design complexity of the IF analog self-interference canceller 130 required to reach a particular quality threshold. For instance, if it is desired to use a PCB having a certain minimum distance between traces for the IF analog self-interference canceller 130, it may be desired to choose an intermediate frequency where the capacitance between traces is not a substantial effect on circuit performance. Additionally or alternatively, the IF analog self-interference canceller 130 may operate at any suitable frequency.

The IF analog self-interference canceller 130 is preferably implemented as an analog circuit that transforms an IF transmit signal into an IF self-interference signal by combining a set of filtered, scaled, and/or delayed versions of the IF transmit signal, but may additionally or alternatively be implemented as any suitable circuit. For instance, the IF analog self-interference canceller 130 may perform a transformation involving only a single version or copy of the IF transmit signal. The transformed signal (the IF self-interference signal) preferably represents at least a part of the self-interference component received at the RF receiver of a full-duplex radio.

The IF analog self-interference canceller 130 is preferably adaptable to changing self-interference parameters in addition to changes in the IF transmit signal; for example, RF transceiver temperature, ambient temperature, antenna configuration, humidity, and RF transmitter power. Adaptation of the IF analog self-interference canceller 130 is preferably performed by a control circuit or other control mechanism included in the canceller 130, but may additionally or alternatively be performed by any suitable controller.

Figure 6:
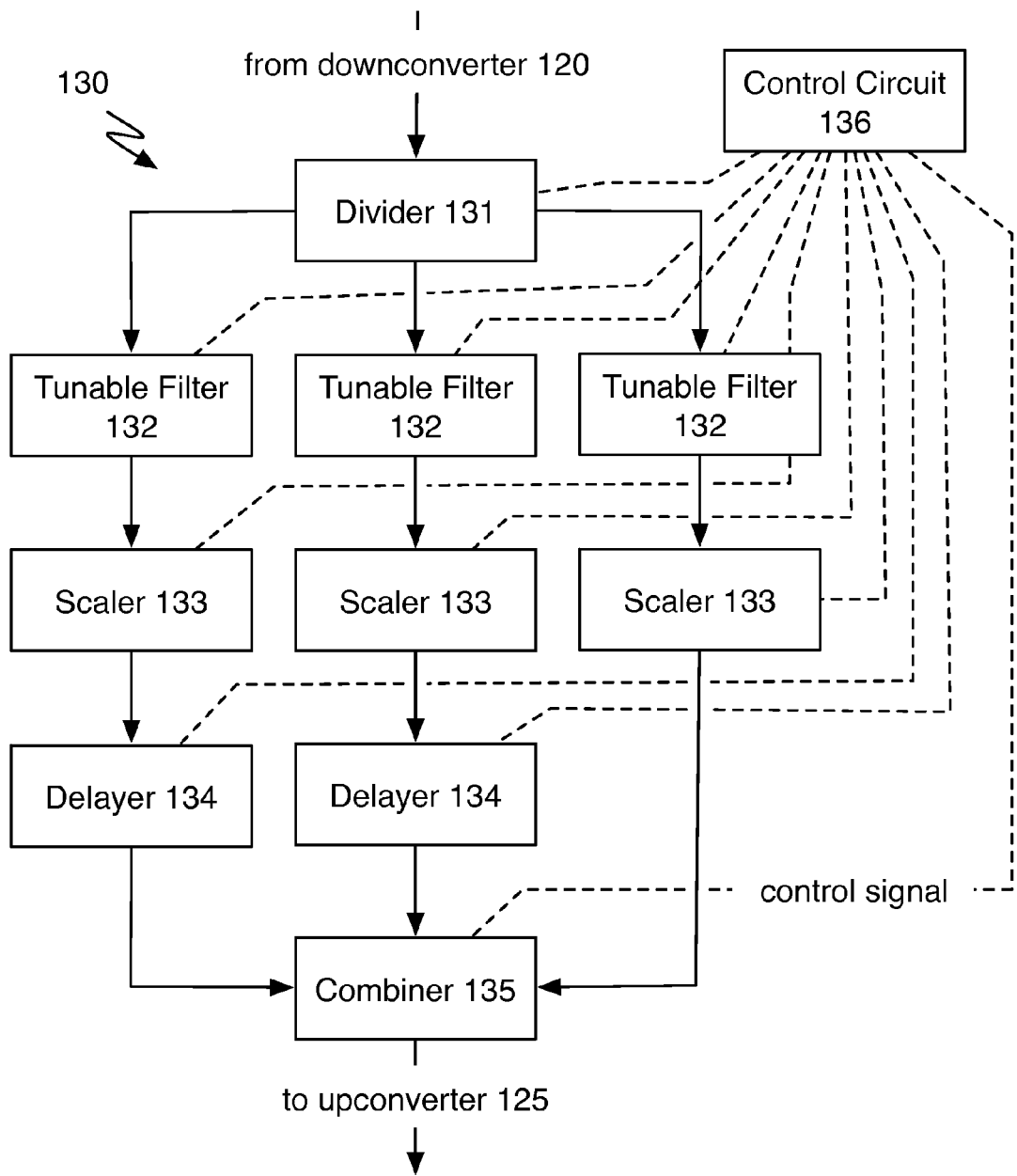
FIG. 6 is a diagram representation of an IF analog self-interference canceller of a system of a preferred embodiment.
Figure 7:
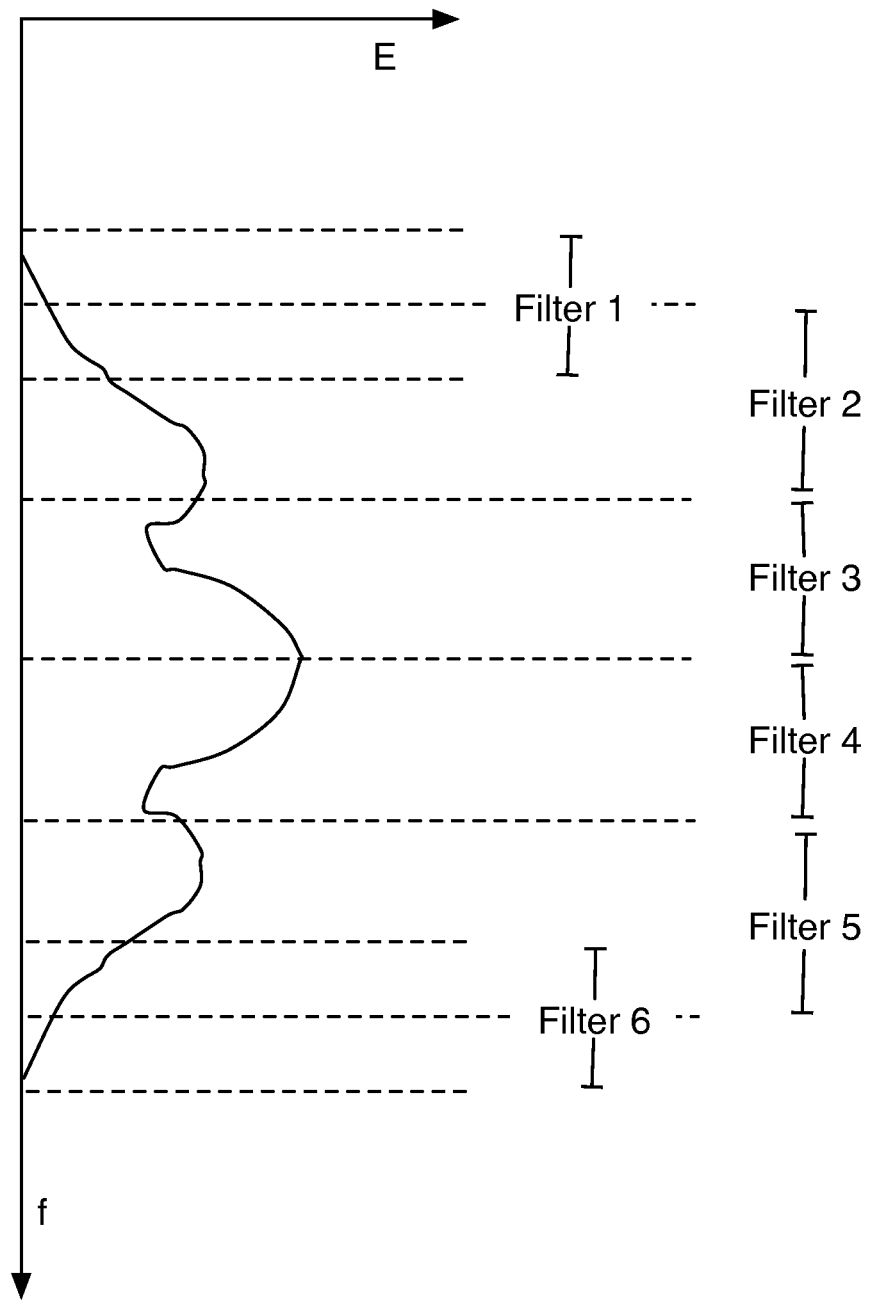
FIG. 7 is a plot representation of a sub-band signal division of an IF transmit signal.

In one implementation of the preferred embodiment, the IF analog self-interference canceller 130 includes a signal divider 131, tunable filters 132, scalers 133, delayers 134, a signal combiner 135 and a control circuit 136, as shown in FIG. 6. In this implementation, the IF analog self-interference canceller 130 splits the IF transmit signal into sub-bands using the tunable filters 132, as shown in FIG. 7, and transforms each of these sub-bands individually before recombining them at the signal combiner 136. Note that the frequency sub-bands may overlap in frequency; there may additionally or alternatively be multiple filters 132 corresponding to the same frequency sub-band. Additionally or alternatively, some tunable filters 132 may pass the entire IF band. The IF analog self-interference canceller 130 preferably transforms each sub-band by scaling (with the scaler 133) and delaying (with the delayer 134) signal components of each sub-band. In one implementation of the IF analog self-interference controller 130, the tunable filter 132 output is coupled to the scaler 133 input and the scaler 133 output is coupled to the delayer 134 input. In a second implementation, the tunable filter 132 output is coupled to the delayer 134 input, and the delayer 134 output is coupled to the scaler 133 input. The components of the IF analog self-interference controller 130 may be coupled in any manner that enables analog self-interference cancellation for the system 100. In one implementation of the IF analog self-interference controller 130, each signal path (i.e., each path associated with a different tunable filter 132) includes both a scaler 133 and a delayer 134; in an alternate implementation, signal paths may include only one of a scaler 133 and a delayer 134 or neither.

Separating the IF transmit signal into sub-bands enables the IF analog self-interference canceller 130 to generate an effective self-interference signal even when self-interference is highly variable with frequency; for instance, in situations where the full-duplex radio has an antenna configuration not optimized for its RF frequency, where the full-duplex radio is placed in a very strong multipath environment, and/or where the RF receiver exhibits a substantially frequency-dependent response to RF signal input.

The signal divider 131 functions to split the IF transmit signal into multiple IF transmit signal paths, each directed to a tunable filter 132. The signal divider 131 preferably splits the IF transmit signal into multiple IF transmit signals having substantially the same waveform as the input IF transmit signal and equal power; the signal divider 131 may additionally or alternatively split the IF transmit signal into multiple IF transmit signals having different power levels and/or containing a different waveform than the input IF transmit signal. The signal divider 131 is preferably a transmission line power divider, but may additionally or alternatively be any suitable power divider, splitter, or coupler. The signal divider 131 may additionally contain any suitable electronics for pre-processing the IF transmit signal before passing it to the tunable filters 132; for example, the signal divider 131 may contain an amplifier to increase the power contained in one or more of the output IF transmit signals.

Each tunable filter 132 functions to isolate IF transmit signal components contained within a frequency band (typically, but not always, a sub-band of the IF transmit signal band) so that the component of self-interference resulting from the part of the IF transmit signal in that frequency band may be generated independently of the components of self-interference resulting from other parts of the IF transmit signal. As previously discussed, isolating IF transmit signal components by frequency sub-band allows for transformations to be performed on each signal component individually, increasing self-interference cancellation performance in situations where self-interference is substantially frequency dependent.

The tunable filters 132 are preferably bandpass filters centered around a tunable intermediate frequency. Additionally or alternatively, the tunable filters 132 may be bandpass filters centered around set radio frequencies, or any other suitable type of filter. The tunable filters 132 are preferably passive filters, but may additionally or alternatively be active filters. The tunable filters 132 are preferably implemented with analog circuit components, but may additionally or alternatively be digitally implemented. The center frequency of each tunable filter 132 is preferably controlled by the control circuit 136, but may additionally or alternatively be controlled by any suitable system (including manually controlled, e.g. as in a mechanically tuned capacitor). Each tunable filter 132 preferably has a set quality (Q) factor, but may additionally or alternatively have a variable Q factor. The tunable filters 132 may have different Q factors; for example, some of the tunable filters 132 may be high-Q, some may be low-Q, and some may be no-Q (flat response).

The scalers 133 function to scale IF transmit signal components; specifically, the scalers 133 effectively multiply the IF transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. The scalers 133 provide the weighting for the combination of IF self-interference components at the signal combiner 135 (e.g. a signal with scale factor 2 is weighted twice as heavily as one with a scale factor of 1).

The scalers 133 may include attenuators, amplifiers, phase inverters, and/or any other suitable components for scaling IF transmit signal components. Attenuators may be resistive attenuators (T pad, Pi pad), amplifiers with less than unity gain, or any other suitable type of attenuator. Amplifiers may be transistor amplifiers, vacuum tube amplifiers, op-amps, or any other suitable type of amplifier. Phase inverters may be any phase inversion devices, including NPN/PNP phase inversion circuits and/or inverting amplifiers.

The scalers 133 preferably are capable of attenuation, gain, and phase inversion, but may alternatively be capable only of a subset of said capabilities. Each scaler 133 preferably includes all three capabilities in a single device (e.g., an amplifier with tunable gain and two outputs, one inverted and one non-inverted) but may additionally or alternatively separate capabilities into different sections (e.g., an amplifier with tunable gain but no inversion capability, along with a separate phase inversion circuit). The scalers 133 are preferably controlled by the control circuit 136, but may additionally or alternatively be controlled in any suitable manner. The control circuit 136 preferably controls scalers 133 by dynamically setting scale factors for each scaler 133, but may additionally or alternatively control scalers 133 in any suitable manner.

The delayers 134 function to delay IF transmit signal components, preferably to match corresponding delays in received self-interference. The delay introduced by each delayer 134 (also referred to as a delayer delay) is preferably variable (i.e., the delayer 134 is a variable delayer), but delayers 134 may additionally or alternatively introduce set delays. The delayer 134 is preferably implemented as an analog delay circuit (e.g., a bucket-brigade device, a long transmission line, a series of RC networks) but may additionally or alternatively be implemented in any other suitable manner. The delay introduced by each delayer 134 is preferably set by the control circuit 136, but may additionally or alternatively be set in any suitable manner. In one implementation of a preferred embodiment, the delayer 134 is part of the tunable filter 132 (e.g., in a butterworth filter with tunable passband and delay).

After transformation by a scaler 133 and/or a delayer 134, IF transmit signal components are transformed into IF self-interference signal components, which may be combined to form an IF self-interference signal.

The signal combiner 135 functions to combine the IF self-interference signal components into an IF self-interference signal; the IF self-interference signal may then be upconverted into an RF self-interference signal and combined with an RF receive signal to remove self-interference. The signal combiner 135 preferable combines IF self-interference signal components (resulting from multiple IF transmit signal paths) and passes the resulting IF self-interference signal to the upconverter 125. The signal combiner 135 is preferably a transmission line coupler, but may additionally or alternatively be any suitable type of coupler (described in the receive coupler 111 and transmit coupler 110 sections). The signal combiner 135 may additionally contain any suitable electronics for post-processing the IF self-interference signal before passing it to the upconverter 125; for example, the signal combiner 135 may contain an amplifier to increase the power of the IF self-interference signal.

The control circuit 136 functions to control the configuration parameters of the IF analog self-interference canceller 130; these variable settings may include pre-processing settings (at the signal divider 131), filter center frequency and/or Q factor (at the tunable filters 132), scale factor (at the scalers 133), delay (at the delayers 134), post-processing settings (at the signal combiner 135) and/or any other suitable variable settings. The control circuit 136 preferably controls tunable filter 132 center frequencies, scaler 133 scale factors (including gain/attenuation/phase inversion), and delayer 134 delays to create an IF self-interference signal that reflects some or all of the self-interference contained within an RF receive signal of the full-duplex radio.

The control circuit 136 preferably sets the configuration state of the IF analog self-interference canceller 130 (where the state includes settings for each variable setting controlled by the control circuit 136) based upon the received IF transmit signal, but may additionally or alternatively set the configuration state based on any other suitable input. Suitable input may include signal data (e.g. IF transmit signal, digital transmit signal, RF receive signal), full-duplex radio settings (e.g. RF transmitter power, antenna position), full-duplex radio characteristics (e.g. receiver operating characteristics, transmitter operating characteristics), environmental data (e.g., transceiver temperature, ambient temperature, ambient humidity), and/or any other input relating to self-interference present in the RF receive signal.

The control circuit 136 preferably sets configuration states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, the control circuit 136 may set configuration states in any suitable manner.

The control circuit 136 may adapt configuration states and/or configuration state generating/choosing algorithms using analytical methods, online gradient-descent methods (e.g., LMS, RLMS), and/or any other suitable methods. The control circuit 136 may additionally or alternatively adapt configuration states and/or configuration state generating/choosing algorithms based on test input scenarios (e.g. scenarios when the signal received by the RF receiver is known), scenarios where there is no input (e.g. the only signal received at the RF receiver is the signal transmitted by the RF transmitter), or scenarios where the received signal is unknown. In cases where the received signal is an unknown signal, the control circuit 136 may perform adaptation based on historical received data (e.g. what the signal looked like ten seconds ago) or any other suitable information. The control circuit 136 may additionally or alternatively perform adaptation based on the content of the RF or IF transmit signals; for instance, if the RF transmit signal is modulated in a particular way, the control circuit 136 may perform adaptation such that when the RF self-interference signal is combined with the RF receive signal the detected modulation (as an indicator of self-interference) is reduced.

The control circuit 136 is preferably implemented as a programmable digital circuit, but may additionally or alternatively be implemented in any suitable digital or analog circuit, including implementation as software in a general purpose computing device.

The digital self-interference canceller 140 functions to produce a digital self-interference signal from a digital transmit signal of the full-duplex radio. The digital self-interference signal is preferably converted to an analog self-interference signal and combined with the IF self-interference signal to further reduce self-interference present in the RF receive signal of the full-duplex radio.

The digital self-interference canceller 140 preferably samples the digital transmit signal of the full-duplex radio (additionally or alternatively, the canceller 140 may sample the RF transmit signal or any other suitable transmit signal) and transforms the digital transmit signal to a digital self-interference signal based on a digital transform configuration. The digital transform configuration preferably includes settings that dictate how the digital self-interference canceller 140 transforms the digital transmit signal to a digital self-interference signal (e.g. coefficients of a generalized memory polynomial used to transform the transmit signal to a self-interference signal).

The digital self-interference canceller 140 may be implemented using a general purpose processor, a digital signal processor, an application specific integrated circuit (ASIC), a field programmable gate array (FPGA) and/or any suitable processor(s) or circuit(s). The digital self-interference canceller 140 preferably includes memory to store configuration data, but may additionally or alternatively be configured using externally stored configuration data or in any suitable manner. In one implementation, the digital self-interference canceller 140 is substantially similar to the digital self-interference canceller of U.S. patent application Ser. No. 14/456,320, filed 11 Aug. 2014, which is incorporated in its entirety by this reference.

The digital self-interference signal converter 150 functions to convert the digital self-interference signal output by the digital self-interference canceller 140 to an analog IF self-interference signal (hereafter referred to as a digitally-sourced intermediate frequency self-interference signal, or DSIF self-interference signal), which can then be combined with the IF self-interference signal by the IF self-interference signal combiner 160. The digital self-interference signal converter 150 preferably converts the digital self-interference signal to a DSIF self-interference signal in a two-step process; first converting the digital self-interference signal to a baseband self-interference signal and then converting the baseband self-interference signal to an IF self-interference signal. Additionally or alternatively, the digital self-interference signal converter 150 may convert the digital self-interference signal to a DSIF self-interference signal using any other suitable process.

Figure 8:
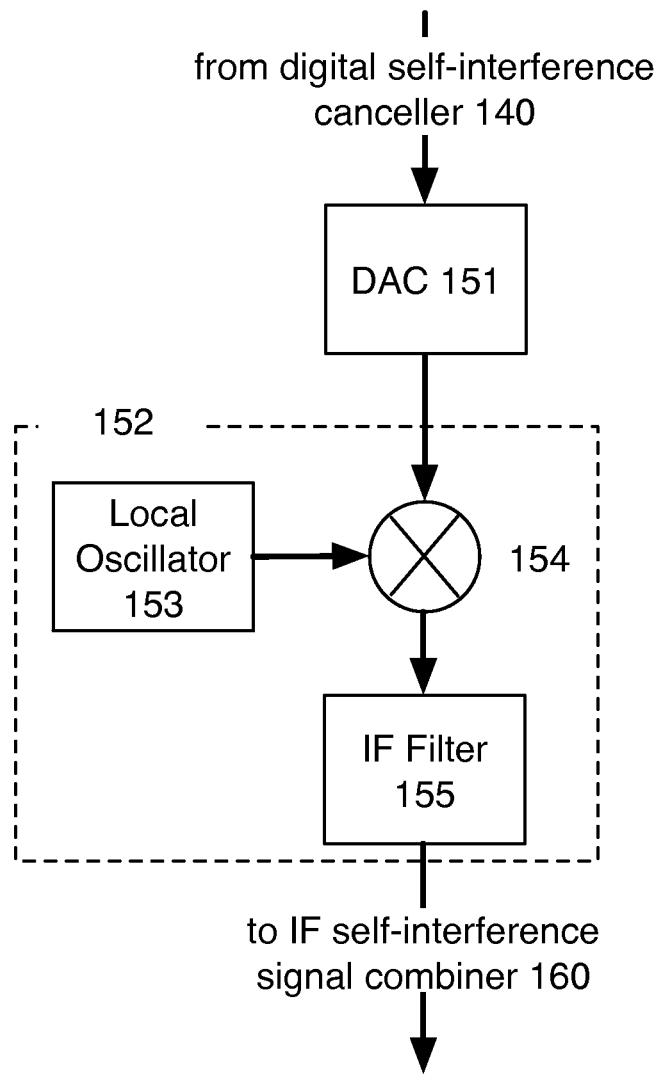
FIG. 8 is a schematic representation of a digital self-interference signal converter of a system of a preferred embodiment.

In one implementation, the digital self-interference signal converter 150 includes a digital-to-analog converter (DAC) 151 and an upconverter 152, as shown in FIG. 8. The DAC 151 functions to convert the digital self-interference signal to a baseband analog self-interference signal, and the upconverter 152 functions to upconvert the baseband analog self-interference signal to an intermediate frequency.

The DAC 151 may be any suitable digital-to-analog converter; e.g., a pulse-width modulator, an oversampling DAC, a binary-weighted DAC, an R-2R ladder DAC, a cyclic DAC, a thermometer-coded DAC, or a hybrid DAC.

The upconverter 152 is preferably substantially similar to the upconverter 125, but may additionally or alternatively be any suitable frequency upconverter. The upconverter 152 preferably includes a local oscillator 153, a mixer 154, and an IF filter 155.

The IF self-interference signal combiner 160 functions to combine the DSIF self-interference signal with the IF self-interference signal. The IF self-interference signal combiner 160 is preferably a transmission line coupler, but may additionally or alternatively be any suitable type of coupler (described in the receive coupler in and transmit coupler no sections). The IF self-interference signal combiner 160 may additionally contain any suitable electronics for post-processing the IF self-interference signal before passing it to the receive coupler 111; for example, the IF self-interference signal combiner may contain an amplifier to increase the power of the IF self-interference signal.

2. Method for Frequency Independent Analog Self-Interference Cancellation

Figure 9:
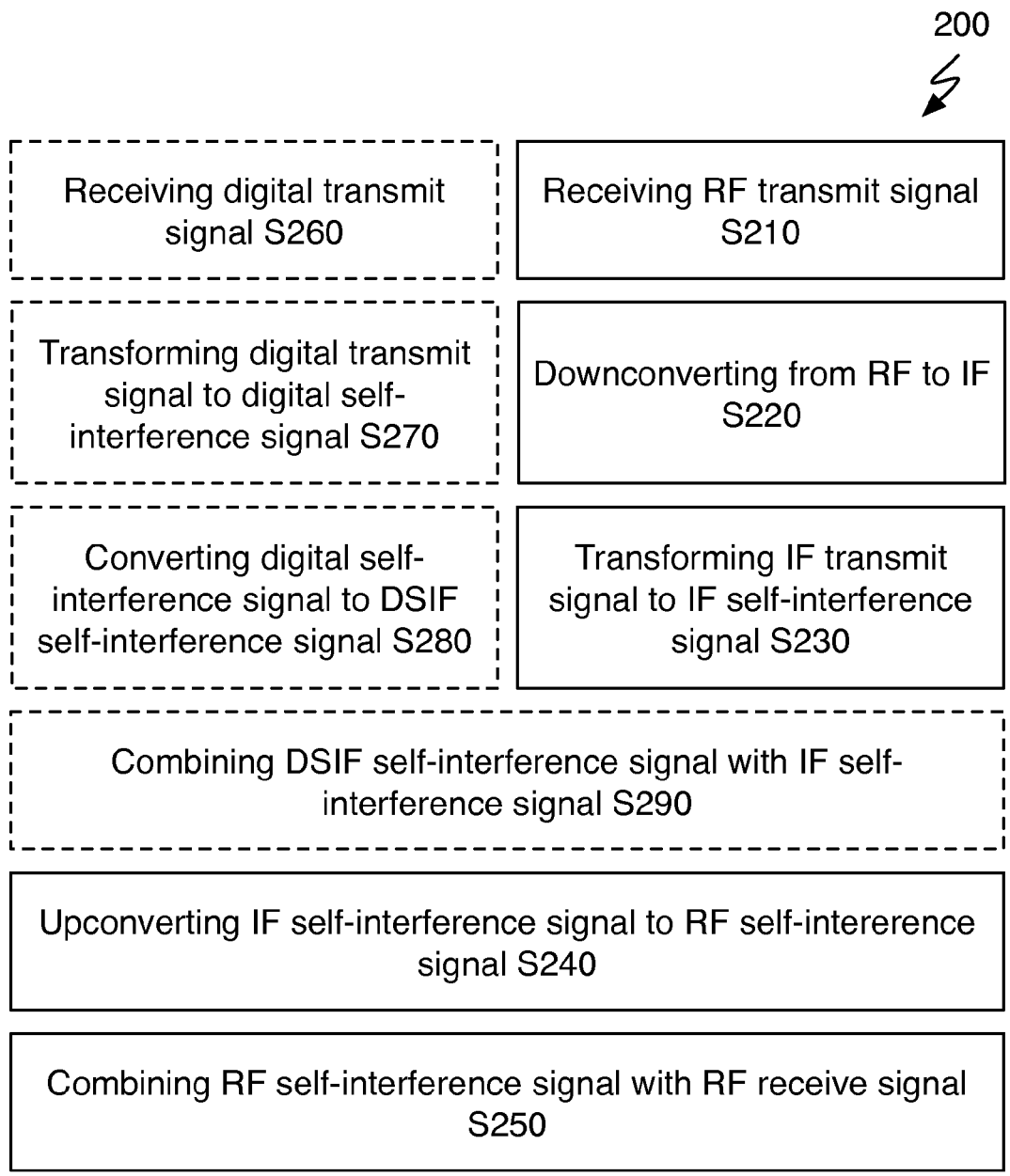
FIG. 9 is a flowchart representation of a method of a preferred embodiment.

As shown in FIG. 9, a method 200 for frequency independent analog self-interference cancellation includes receiving a radio-frequency (RF) transmit signal S210, downconverting the RF transmit signal to an intermediate frequency (IF) transmit signal S220, transforming the IF transmit signal into an IF self-interference signal S230, upconverting the IF self-interference signal to an RF self-interference signal S240, and combining the RF self-interference signal with an RF receive signal S250. The method 200 may additionally include receiving a digital transmit signal S260, transforming the digital transmit signal into a digital self-interference signal S270, converting the digital self-interference signal to a digitally-sourced (DS) IF self-interference signal S280, and combining the DSIF self-interference signal with the IF self-interference signal S290.

Figure 11:
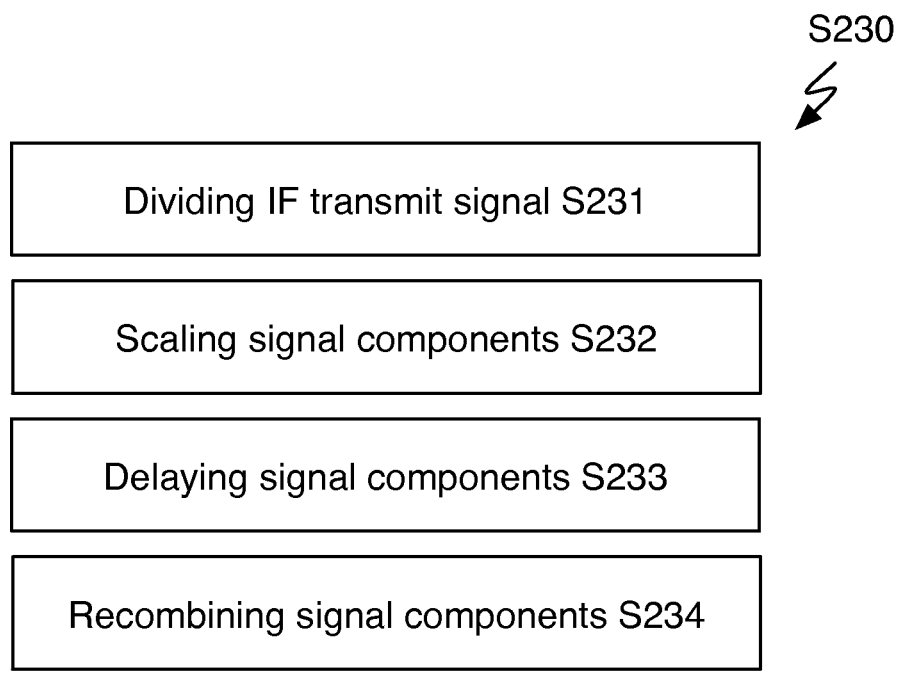
FIG. 11 is a flowchart representation of a IF transmit signal transformation step of a method of a preferred embodiment.

The method 200 functions to increase the performance of full-duplex transceivers by performing tunable filter-based analog self-interference cancellation in an intermediate-frequency (IF) domain. By downconverting an RF transmit signal of a full-duplex radio to an intermediate frequency (S220) and transforming the transmit signal to a self-interference signal in the intermediate frequency (S230) before upconverting the self-interference signal back to radio frequency (S240) and combining it with the RF receive signal of the full-duplex radio (S250), the method 200 enables analog self-interference cancellation independent of the radio frequency. Frequency independence allows for self-interference signal transformation to be improved for a single intermediate frequency if desired. In one implementation of a preferred embodiment (as shown in FIG. 11), S230 includes splitting the IF transmit signal into frequency band sections (corresponding to frequency sections of the original RF transmit signal); separating the self-interference generation into band sections allows for generation of accurate self-interference signals even in situations where self-interference is highly variable across frequency sections.

The method 200 is preferably implemented by the system 100, but may additionally or alternatively be implemented by any suitable system for frequency-independent analog self-interference cancellation used with full-duplex wireless communications systems.

S210 includes receiving a radio-frequency (RF) transmit signal. S210 functions to provide an analog RF signal intended for transmission by a full-duplex wireless communications system so that the signal may be used to remove self-interference at the full-duplex wireless communications system receiver. RF transmit signals received in S210 preferably include RF signals originating from an electronic device, destined for an antenna or other communication output of a full-duplex radio (or other full-duplex wireless communications system). RF transmit signals received in S210 may additionally or alternatively include RF transmit signals from any other suitable source.

S210 preferably comprises receiving the RF transmit signal by splitting an RF signal somewhere in the signal path between the RF transmitter and the antenna(e) (or other signal output) and passing the RF transmit signal to an frequency downconverter, but may additionally or alternatively receive the RF transmit signal using any other suitable method.

Figure 10A:
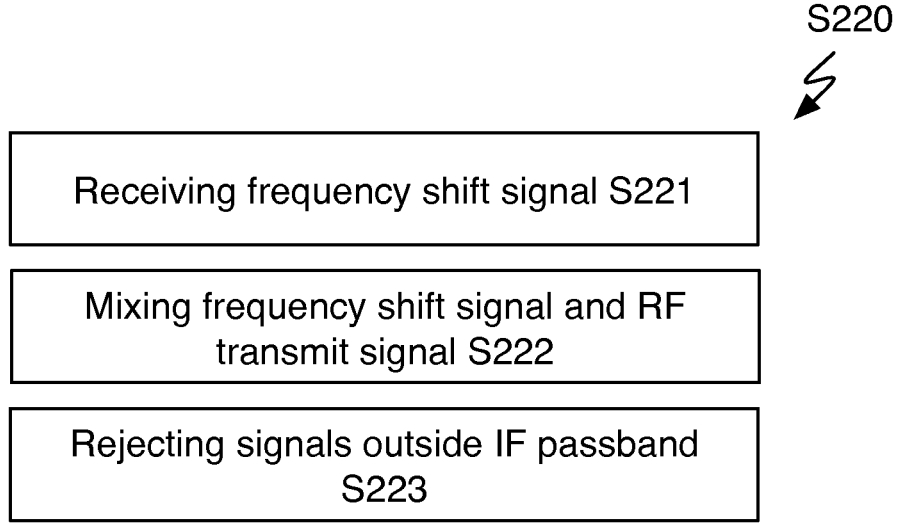
FIG. 10A is a flowchart representation of a downconversion step of a method of a preferred embodiment.

S220 includes downconverting the RF transmit signal to an intermediate frequency (IF) transmit signal. S220 functions to downconvert the carrier frequency of the RF transmit signal (received in S210) to an intermediate frequency (or, in some cases, baseband (IF=0 Hz)) preparing it for transformation to an IF self-interference signal. S220 preferably includes downconverting the RF transmit signal using heterodyning methods, but may additionally or alternatively use any suitable downconversion methods. More specifically, S220 may include receiving a frequency shift signal from a local oscillator S221, mixing the frequency shift signal and the RF transmit signal at a mixer S222, and rejecting product signals outside the IF passband S223, as shown in FIG. 10A. S221 functions to receive a signal to be combined with the RF transmit signal in a mixer; S222 functions to mix the frequency shift signal and the RF transmit signal to create (usually two) frequency shifted signals, only one of which is the IF transmit signal and in the IF passband; and S223 functions to reject signals other than the IF transmit signal.

In one example, the RF transmit signal has a carrier frequency of 2.4 GHz, and the desired IF frequency is 100 MHz. S221 includes receiving a frequency shift signal at 2.3 GHz. S222 includes mixing the RF transmit signal and the frequency shift signal to produce two output signals; a frequency sum signal (at 4.7 GHz) and a frequency difference signal (at 100 MHz). S223 includes passing the signal through a bandpass filter centered around 100 MHz that allows the 100 MHz signal to pass, but rejects the 4.7 GHz signal. The resulting 100 MHz signal is the IF transmit signal.

S220 may enable RF signals of different carrier frequency to be downconverted to the same IF carrier frequency. Enabling different RF carrier frequencies to be converted to the same IF carrier frequency allows IF analog self-interference generation to occur at a single (IF) frequency independent of RF frequencies.

S220 may additionally or alternatively include any other suitable processing to prepare the RF transmit signal for transformation in S230 (e.g., scaling, shifting, and/or otherwise modifying the RF transmit signal).

S230 includes transforming the IF transmit signal into an IF self-interference signal. S230 functions to produce an IF self-interference signal from the IF transmit signal (i.e., the downconverted RF transmit signal) that, after upconversion, can be combined with the RF receive signal to reduce self-interference present in the RF receive signal. Transforming the IF transmit signal S230 preferably occurs in a single IF frequency band, but may additionally or alternatively occur in multiple distinct IF frequency bands. Because signals of multiple RF frequency bands may be converted to the same IF frequency band, S230 may include performing self-interference cancellation for multiple RF frequency bands even if S230 includes operating only in a single IF frequency band.

S230 preferably includes transforming an IF transmit signal into an IF self-interference signal by combining a set of filtered, scaled, and/or delayed versions of the IF transmit signal, but transform IF transmit signals to IF self-interference signals in any suitable manner. The transformed signal (the IF self-interference signal) preferably represents at least a part of the self-interference component received at the RF receiver of a full-duplex radio.

The transformation performed in S230 is preferably adaptable to changing self-interference parameters in addition to changes in the IF transmit signal; for example, RF transceiver temperature, ambient temperature, antenna configuration, humidity, and RF transmitter power.

In one implementation of a preferred embodiment, S230 includes dividing the IF transmit signal into signal components by frequency sub-band S231, scaling signal components S232, delaying signal components S233, and recombining signal components S234, as shown in FIGURE ii. This implementation separates the IF transmit signal into frequency sub-bands; enabling the generation of effective self-interference signal even when self-interference is highly variable with frequency; for instance, in situations where the full-duplex radio has an antenna configuration not optimized for its RF frequency, where the full-duplex radio is placed in a very strong multipath environment, and/or where the RF receiver exhibits a substantially frequency-dependent response to RF signal input.

S231 includes dividing the IF transmit signal into signal components by frequency sub-band. Frequency sub-bands may overlap in frequency; there may additionally or alternatively be multiple signal components corresponding to the same frequency sub-band. In some cases, frequency sub-bands may encompass the entire IF passband.

S231 preferably includes splitting the IF transmit signal into multiple IF transmit signal paths and then filtering each signal path. The multiple IF transmit signal paths preferably have substantially the same waveform as the input IF transmit signal and equal power; S231 may additionally or alternatively include splitting the IF transmit signal into multiple IF transmit signals having different power levels and/or containing a different waveform than the input IF transmit signal. S231 preferably filters each signal path to isolate IF transmit signal components contained within a frequency band (typically, but not always, a sub-band of the IF transmit signal band) so that the component of self-interference resulting from the part of the IF transmit signal in that frequency band may be generated independently of the components of self-interference resulting from other parts of the IF transmit signal. As previously discussed, isolating IF transmit signal components by frequency sub-band allows for transformation to be performed on each signal component individually, increasing self-interference cancellation performance in situations where self-interference is substantially frequency dependent. Splitting parameters are preferably controlled dynamically, but may additionally or alternatively be static.

S232 includes scaling signal components. S232 functions to effectively multiply the IF transmit signal components by a scale factor. For example, an attenuation of 34% might be represented as a scale factor of 0.66; a gain of 20% might be represented as a scale factor of 1.20; and an attenuation of 10% and a phase inversion might be represented as a scale factor of −0.90. Thus, S232 also functions to provide weighting for the combination of IF self-interference components during S234 (e.g., a signal with scale factor 2 is weighted twice as heavily as one with a scale factor of 1). Scaling may include attenuating, amplifying, and/or inverting phase. Scaling parameters are preferably controlled dynamically, but may additionally or alternatively be static.

S233 includes delaying signal components. S232 functions to delay IF transmit signal components, preferably to match corresponding delays in received self-interference. The delay introduced by S232 in each signal component is preferably variable (and controlled dynamically) but S232 may additionally or alternatively include introducing set delays.

After transformation by S232 and/or S233, IF transmit signal components are transformed into IF self-interference signal components, which may be combined to form an IF self-interference signal.

S234 includes recombining signal components. S234 functions to combine the IF self-interference signal components into an IF self-interference signal; the IF self-interference signal may then be upconverted into an RF self-interference signal and combined with an RF receive signal to remove self-interference. S234 preferably includes recombining signal components without performing any additional weighting (beyond that performed by S232) but may additionally or alternatively include any suitable post-processing to prepare the IF self-interference signal for upconversion and combination with the RF receive signal; for example, amplifying, delaying, or inverting the IF self-interference signal.

Figure 12:
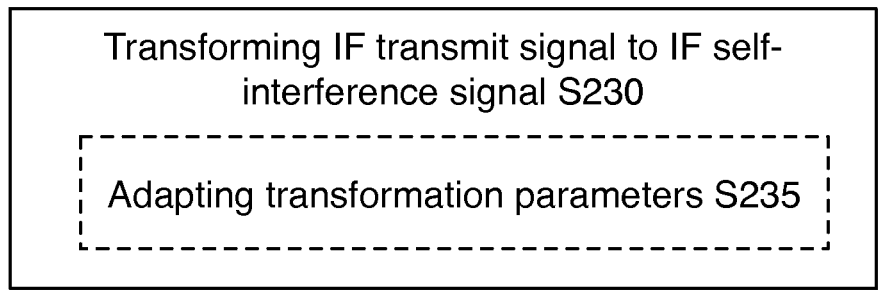
FIG. 12 is a flowchart representation of a IF transmit signal transformation step of a method of a preferred embodiment.

In a variation of a preferred embodiment, the method 200 may additionally include adapting transformation parameters S235, as shown in FIG. 12. S235 functions to control the transformation parameters of the transformation of S230. These transformation parameters may include the number of IF transmit signal divisions, the center frequencies and bandwidths of the sub-bands for each division (parameters of S231); scaling factors (parameters of S232); delays (parameters of S233), and/or post-processing settings (parameters of S234). S235 preferably includes adapting transformation parameters to account for some or all of the self-interference contained within an RF receive signal of the full-duplex radio.

S235 may include setting transformation states (where each state includes settings for the transformation parameters adapted in S235) based on the received IF or RF transmit signals, but may additionally or alternatively include setting transformation states based on any other suitable input. Suitable input may include signal data (e.g., IF transmit signal, digital transmit signal, RF receive signal), full-duplex radio settings (e.g., RF transmitter power, antenna position), full-duplex radio characteristics (e.g., receiver operating characteristics, transmitter operating characteristics), environmental data (e.g., transceiver temperature, ambient temperature, ambient humidity), and/or any other input relating to self-interference present in the RF receive signal.

S235 preferably includes setting transformation states based on an algorithm responsive to input. This may include a state-choosing algorithm that selects from a set of pre-chosen states based on some input parameter set, a dynamic algorithm that generates states based on the input parameter set (as opposed to choosing from a limited state set), or any other suitable algorithm. Additionally or alternatively, S235 may include setting transformation states in any suitable manner.

S235 may include adapting transformation states and/or transformation state generating/choosing algorithms using analytical methods, online gradient-descent methods (e.g., LMS, RLMS), and/or any other suitable methods. Transformation states and/or transformation state generating/choosing algorithms may additionally or alternatively be adapted based on test input scenarios (e.g., scenarios when the signal received by the RF receiver is known), scenarios where there is no input (e.g., the only signal received at the RF receiver is the signal transmitted by the RF transmitter), or scenarios where the received signal is unknown. In cases where the received signal is an unknown signal, adaptation may be performed based on historical received data (e.g., what the signal looked like ten seconds ago) or any other suitable information. Adaptation may additionally or alternatively be based on the content of the RF or IF transmit signals; for instance, if the RF transmit signal is modulated in a particular way, adaptation may be performed such that when the RF self-interference signal is combined with the RF receive signal the detected modulation (as an indicator of self-interference) is reduced.

Figure 10B:
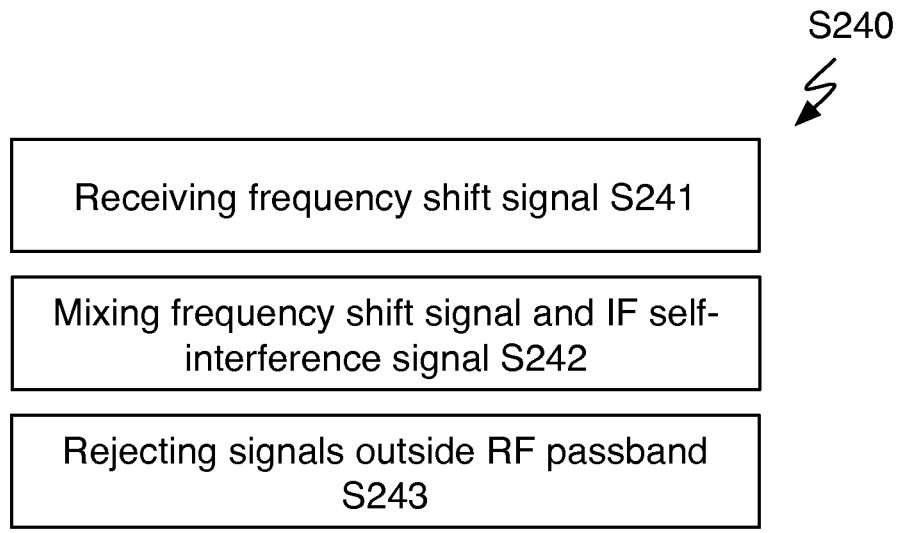
FIG. 10B is a flowchart representation of an upconversion step of a method of a preferred embodiment.

S240 includes upconverting the IF self-interference signal to an RF self-interference signal. S240 functions to upconvert the carrier frequency of the IF self-interference signal (generated in S230) to the RF carrier frequency of the RF receive signal (or any other suitable RF frequency) preparing it for combination with the RF receive signal. S240 preferably includes upconverting the IF self-interference signal using heterodyning methods, but may additionally or alternatively use any suitable upconversion methods. More specifically, S240 may include receiving a frequency shift signal from a local oscillator S241, mixing the frequency shift signal and the IF self-interference signal at a mixer S242, and rejecting product signals outside the RF passband S243, as shown in FIG. 10B. S241 functions to receive a signal to be combined with the IF self-interference signal in a mixer; S242 functions to mix the frequency shift signal and the IF self-interference signal to create (usually two) frequency shifted signals, only one of which is the RF self-interference signal and in the RF passband; and S243 functions to reject signals other than the RF self-interference signal.

In one example, the IF self-interference signal has a carrier frequency of 100 MHz, and the desired RF frequency is 2.4 GHz. S241 includes receiving a frequency shift signal at 2.3 GHz. S242 includes mixing the IF self-interference signal and the frequency shift signal to produce two output signals; a frequency sum signal (at 2.4 GHz) and a frequency difference signal (at 2.2 GHz). S243 includes passing the signal through a bandpass filter centered around 2.4 GHz that allows the 2.4 GHz signal to pass, but rejects the 2.2 GHz signal. The resulting 2.4 GHz signal is the RF self-interference signal.

S240 may additionally or alternatively include any other suitable processing to prepare the IF self-interference signal for combination with the RF receive signal in S250 (e.g., scaling, shifting, and/or otherwise modifying the IF self-interference signal).

S250 includes combining the RF self-interference signal with an RF receive signal. S250 functions to couple the RF self-interference signal generated by the method 200 to the RF receive signal of the full-duplex radio. S250 preferably includes coupling the majority of input power to the RF receiver signal; this coupling preferably results in the RF receiver receiving a sum of the self-interference signal (generated by the method 200) and the RF receive signal (received at the antenna(e)). Additionally or alternatively, S250 may include coupling or routing power in any suitable manner.

S260 includes receiving a digital transmit signal. S260 functions to provide a digital signal intended for transmission by a full-duplex wireless communications system so that the signal may be used, in addition to the RF transmit signal, to remove self-interference at the full-duplex wireless communications system receiver. Digital transmit signals received in S260 preferably include digital signals originating from an electronic device, destined for an RF transmitter of a full-duplex radio (or other full-duplex wireless communications system). Digital transmit signals received in S260 are preferably encoded for conversion to an analog signal by an RF transmitter, (e.g., encoded via PSK, QAM, OFDM, etc.) but may additionally or alternatively be encoded in any suitable way.

S270 includes transforming the digital transmit signal into a digital self-interference signal. S270 functions to produce a digital self-interference signal from a digital transmit signal of the full-duplex radio. The digital self-interference signal is preferably converted to an analog self-interference signal and combined with the IF self-interference signal to further reduce self-interference present in the RF receive signal of the full-duplex radio. S270 preferably includes sampling the digital transmit signal of the full-duplex radio (additionally or alternatively, S270 may include sampling the RF transmit signal or any other suitable transmit signal) and transforming the digital transmit signal to a digital self-interference signal based on a digital transform configuration. The digital transform configuration preferably includes settings that dictate how the digital transmit signal is transformed to a digital self-interference signal (e.g., coefficients of a generalized memory polynomial used to transform the transmit signal to a self-interference signal).

S280 includes converting the digital self-interference signal to a digitally-sourced (DS) IF self-interference signal. S280 functions to convert the digital self-interference signal output of S270 to an analog IF self-interference signal (hereafter referred to as a digitally-sourced intermediate frequency self-interference signal, or DSIF self-interference signal), which can then be combined with the IF self-interference signal by S290. S280 preferably includes converting the digital self-interference signal to a DSIF self-interference signal in a two-step process; first converting the digital self-interference signal to a baseband self-interference signal and then converting the baseband self-interference signal to an IF self-interference signal. Additionally or alternatively, S280 may include converting the digital self-interference signal to a DSIF self-interference signal using any other suitable process.

S290 includes combining the DSIF self-interference signal with the IF self-interference signal. S290 functions to increase self-interference cancellation ability of the self-interference signal through the use of both analog and digitally-sourced self-interference signals. S290 preferably includes coupling the majority of input powers into an output equally, but may additionally or alternatively couple more power from the analog signal than the digitally-sourced signal or vice versa. Additionally or alternatively, S290 may include combining the DSIF self-interference signal with the IF self-interference signal in any suitable manner.

The methods of the preferred embodiment and variations thereof can be embodied and/or implemented at least in part as a machine configured to receive a computer-readable medium storing computer-readable instructions. The instructions are preferably executed by computer-executable components preferably integrated with a system for frequency-independent analog self-interference cancellation. The computer-readable medium can be stored on any suitable computer-readable media such as RAMs, ROMs, flash memory, EEPROMs, optical devices (CD or DVD), hard drives, floppy drives, or any suitable device. The computer-executable component is preferably a general or application specific processor, but any suitable dedicated hardware or hardware/firmware combination device can alternatively or additionally execute the instructions.

As a person skilled in the art will recognize from the previous detailed description and from the figures and claims, modifications and changes can be made to the preferred embodiments of the invention without departing from the scope of this invention defined in the following claims.

We claim:

1. A system for analog self-interference cancellation comprising:
    a transmit coupler, communicatively coupled to an RF transmit signal of a full-duplex wireless communication system, that samples the RF transmit signal to create a sampled RF transmit signal having a first RF carrier frequency;
    a frequency downconverter that converts the sampled RF transmit signal to an IF transmit signal having an IF carrier frequency, wherein the IF carrier frequency is less than the first RF carrier frequency and greater than baseband;
    an IF analog self-interference canceller that transforms, in the IF domain and without downconverting the IF transmit signal to a baseband transmit signal, the IF transmit signal to an IF self-interference signal;
    a frequency upconverter that converts the IF self-interference signal to an RF self-interference signal having a second RF carrier frequency; and
    a receive coupler, communicatively coupled to an RF receive signal of the full-duplex wireless communication system, that combines the RF self-interference signal with the RF receive signal.

2. The system of claim 1, further comprising a control circuit that sets a configuration state of the IF analog self-interference canceller in response to at least one of sampled signal data, full-duplex radio settings, full-duplex radio characteristics, and environmental data.

3. The system of claim 2, wherein the control circuit adapts the configuration state based on at least one of historical received data, RF transmit signal content, IF transmit signal content and a test signal.

4. The system of claim 1, wherein the IF analog self-interference canceller comprises a signal divider, a set of tunable filters, a set of scalers and delayers, and a signal combiner.

5. The system of claim 4, wherein each scaler of the set of scalers and delayers comprises an attenuator.

6. The system of claim 4, wherein the IF analog self-interference canceller passes the IF transmit signal through the signal divider and the set of tunable filters to produce a set of IF transmit signal components comprising a plurality of frequency sub-bands; wherein the IF analog self-interference canceller passes the set of IF transmit signal components through at least a subset of the set of scalers and delayers to create a set of IF self-interference signal components; wherein the IF analog self-interference canceller passes the IF self-interference signal components through the signal combiner to produce the IF self-interference signal.

7. The system of claim 6, wherein at least two of the plurality of frequency sub-bands overlap.

8. The system of claim 1, further comprising a digital self-interference canceller that transforms a digital transmit signal of the full-duplex wireless communication system to a digital self-interference signal; a digital self-interference signal converter that converts the digital self-interference signal to a digitally-sourced IF self-interference signal; and an IF self-interference signal combiner that combines the digitally-sourced IF self-interference signal with the IF self-interference signal.

9. A method for analog self-interference cancellation comprising:
  receiving an RF transmit signal of a full-duplex radio;
  frequency downconverting the RF transmit signal to an IF transmit signal;
  transforming the IF transmit signal into an IF self-interference signal using an IF analog self-interference cancelling circuit;
  frequency upconverting the IF self-interference signal to an RF self-interference signal; and
  after frequency upconverting the IF self-interference signal, combining the RF self-interference signal with an RF receive signal of the full-duplex radio.

10. The method of claim 9, wherein frequency downconverting the RF transmit signal comprises frequency downconverting the RF transmit signal to baseband.

11. The method of claim 9, further comprising adapting transformation parameters to reduce self-interference contained within the RF receive signal; wherein adapting comprises setting transformation states using an algorithm responsive to changes in the RF transmit signal.

12. The method of claim 9, wherein transforming the IF transmit signal comprises dividing the IF transmit signal into a set of IF transmit signal components, each of the set of IF transmit signal components contained within a frequency sub-band of an IF band; scaling a first subset of the set of IF transmit signal components; delaying a second subset of the set of IF transmit signal components; and combining the set of IF transmit signal components into the IF self-interference signal.

13. The method of claim 12, further comprising adapting transformation parameters to reduce self-interference contained within the RF receive signal; wherein adapting comprises setting transformation parameters using an algorithm responsive to changes in the RF transmit signal; wherein transformation parameters comprise IF transmit signal division number, frequency sub-band center frequencies, frequency sub-band bandwidths, scaling factors, and delay magnitudes.

14. The method of claim 13, wherein adapting further comprises adapting the algorithm based on self-interference present in a known RF receive signal.

15. The method of claim 9, further comprising receiving a digital transmit signal; transforming the digital transmit signal into a digital self-interference signal; converting the digital self-interference signal to a digitally-sourced IF self-interference signal; and combining the digitally-sourced IF self-interference signal with the RF self-interference signal.

16. The method of claim 12, further comprising receiving a digital transmit signal; transforming the digital transmit signal into a digital self-interference signal; converting the digital self-interference signal to a digitally-sourced IF self-interference signal; and combining the digitally-sourced IF self-interference signal with the RF self-interference signal.

17. The method of claim 13, wherein adapting transformation parameters comprises adapting transformation parameters according to a gradient descent method.

18. The method of claim 17, wherein adapting further comprises adapting transformation parameters based on a known test signal present in an RF receive signal.

* * * * *